(12) United States Patent
Yao

(10) Patent No.: US 8,710,961 B2
(45) Date of Patent: Apr. 29, 2014

(54) ANTI-FAKE BATTERY PACK AND IDENTIFICATION SYSTEM THEREOF

(75) Inventor: Chih-Ang Yao, Taipei (TW)

(73) Assignee: Li-Ho Yao, Taipei (TW)

( * ) Notice: Subject to any disclaimer, the term of this patent is extended or adjusted under 35 U.S.C. 154(b) by 811 days.

(21) Appl. No.: 12/946,837

(22) Filed: Nov. 15, 2010

(65) Prior Publication Data

US 2011/0121951 A1    May 26, 2011

(30) Foreign Application Priority Data

Nov. 23, 2009  (TW) .............................. 98139690 A

(51) Int. Cl.
*H04Q 5/22* (2006.01)
*G08B 21/00* (2006.01)
*G08B 5/22* (2006.01)
*G01N 27/416* (2006.01)
*H04M 1/00* (2006.01)

(52) U.S. Cl.
USPC ............... 340/10.42; 340/10.1; 340/636.1; 340/7.32; 340/12.1; 340/539.22; 324/430; 324/426; 324/434; 324/658; 455/562.1; 455/272

(58) Field of Classification Search
CPC .............................. G01R 31/3606; H01Q 3/36
USPC ............ 340/10.42, 636.15, 636.1, 7.32, 10.1, 340/12.1; 324/430, 426, 434, 658; 455/562, 455/272
See application file for complete search history.

(56) References Cited

U.S. PATENT DOCUMENTS

| 7,098,793 | B2 * | 8/2006 | Chung ........................ 340/572.1 |
| 2005/0149707 | A1 * | 7/2005 | Jourdan et al. ................ 712/239 |
| 2005/0258962 | A1 * | 11/2005 | Phipps et al. .............. 340/572.1 |
| 2006/0038572 | A1 | 2/2006 | Philbrook |
| 2008/0256296 | A1 * | 10/2008 | Maeda ........................... 711/118 |
| 2009/0212781 | A1 * | 8/2009 | Bertness et al. .............. 324/426 |

FOREIGN PATENT DOCUMENTS

| CN | 1805171 A | 7/2006 |
| DE | 602005006411 T2 | 8/2008 |
| DE | 112007001635 T5 | 6/2009 |
| EP | 1755097 A1 | 2/2007 |
| JP | 2005-202896 A | 7/2005 |
| JP | 2005302635 A | 10/2005 |
| TW | 200721053 A | 6/2007 |
| TW | 200915198 A | 4/2009 |
| TW | 200939552 A | 9/2009 |

* cited by examiner

*Primary Examiner* — Fekadeselassie Girma
(74) *Attorney, Agent, or Firm* — patenttm.us

(57) ABSTRACT

An anti-fake battery pack and an identification system thereof has a casing and multiple battery cells, each of which as a battery body, an inner identifier mounted outside the battery body, a protection layer mounted around outside of the battery body and the outer identifier formed on the protection layer. An external identifying device has to read a first and second identification codes from the inner and outer identifiers to determine whether the battery cell is authentic or not. In addition, the inner identifier is covered by the protection layer, so the inner identifier can not stolen without breaking the protection layer with the outer identifier. Therefore, the identifying system provides double identifying procedures to increase security of identification and decrease the possibility of copying the first and second identification codes.

59 Claims, 8 Drawing Sheets

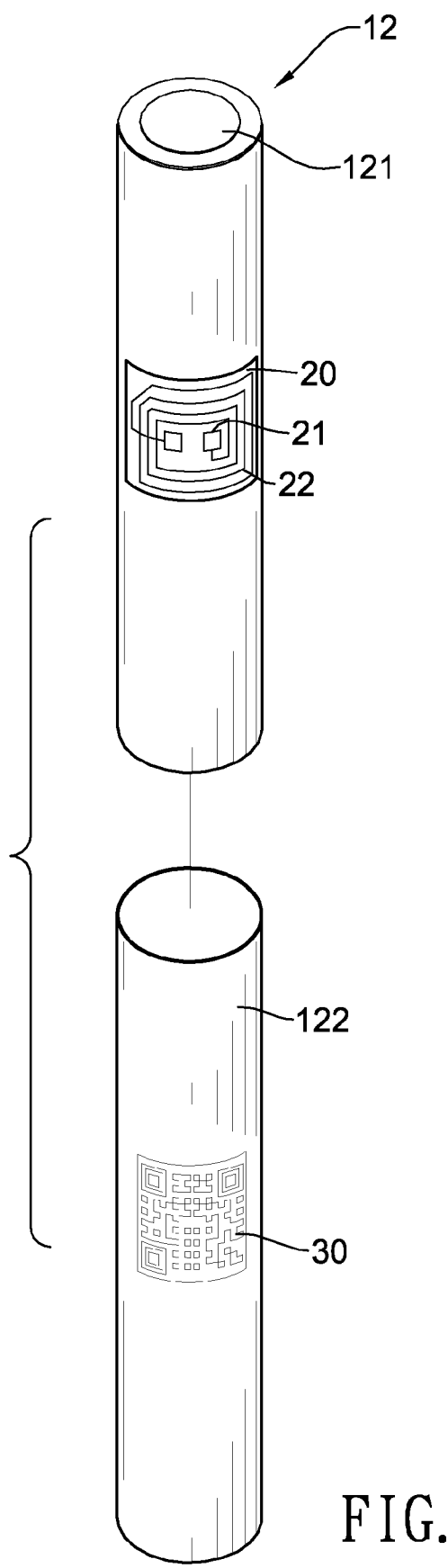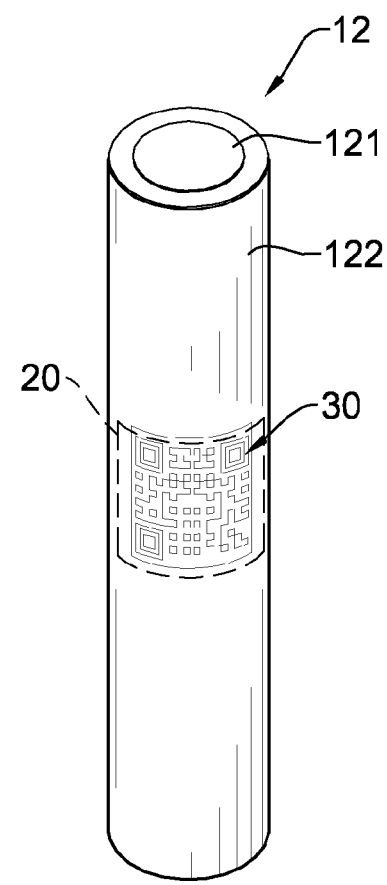
FIG. 3A
FIG. 3B

ANTI-FAKE BATTERY PACK AND IDENTIFICATION SYSTEM THEREOF

BACKGROUND OF THE INVENTION

1. Field of the Invention

The present invention relates to the filed of identification system, and more particularly to an anti-fake battery pack and an identification system of the anti-fake battery pack.

2. Description of Related Art

With reference to FIG. 8, battery pack 50 is common for portable electronic devices, such as notebook computer, mobile phones, electric ground vehicles, or hybrid vehicles. Since the battery pack 50 has to provide charging and recharging capability, the battery pack 50 has a casing 51, multiple batty cells 52 and multiple conductive buses 521. The battery cells 52 are securely mounted in the casing 51 and electronically connected to each other by the corresponding conductive bus 521.

The battery is required to have stable power function, especially for electric ground vehicle or hybrid vehicle, so the cost of the battery pack is very expensive. That is why some merchants collect the discarded original battery packs to take the casing with trademark and then put fake battery cells with low quality therein to make a fake battery pack. Since the customer only determines whether the battery pack is authentic or not by checking the trademark of the casing, most of customers are easily deceived. In addition, when the electric ground vehicle uses a battery pack having low quality battery cells, driving the electric ground vehicle is no longer safe.

When the fake battery pack fails, it is very difficult for the original battery manufacturer to identify and prove whether the failure of the battery cells was caused by those fake substitute battery cells.

To overcome the shortcomings, the present invention provides an anti-fake battery pack and an identification system for the anti-fake battery pack to mitigate or obviate the aforementioned problems.

SUMMARY OF THE INVENTION

The main objective of the present invention is to provide an anti-fake battery pack and an identification system thereof. The anti-fake battery pack has double identifying procedures to ensure that the battery cells or battery casing is not fake.

The anti-fake battery pack has a casing and multiple battery cells, each of which has a battery body, an inner identifier mounted outside the battery body, a protection layer mounted around outside of the battery body and the outer identifier formed on the protection layer. An external identifying device has to read a first and second identification codes from the inner and outer identifiers to determine whether the battery cell is authentic or not. In addition, the inner identifier is covered by the protection layer, so the inner identifier is not stolen without breaking the protection layer with the outer identifier. Therefore, the present invention provides double identifying procedures to increase the security of identification and decrease the possibility of copying the first and second identification codes.

Other objectives, advantages and novel features of the invention will become more apparent from the following detailed description when taken in conjunction with the accompanying drawings.

BRIEF DESCRIPTION OF THE DRAWINGS

FIG. 3A is partial exploded perspective view of a battery cell of the battery pack in accordance with the present invention;

FIG. 3B is a perspective view of FIG. 3A;

DETAILED DESCRIPTION OF THE PREFERRED EMBODIMENT

Figure 1:
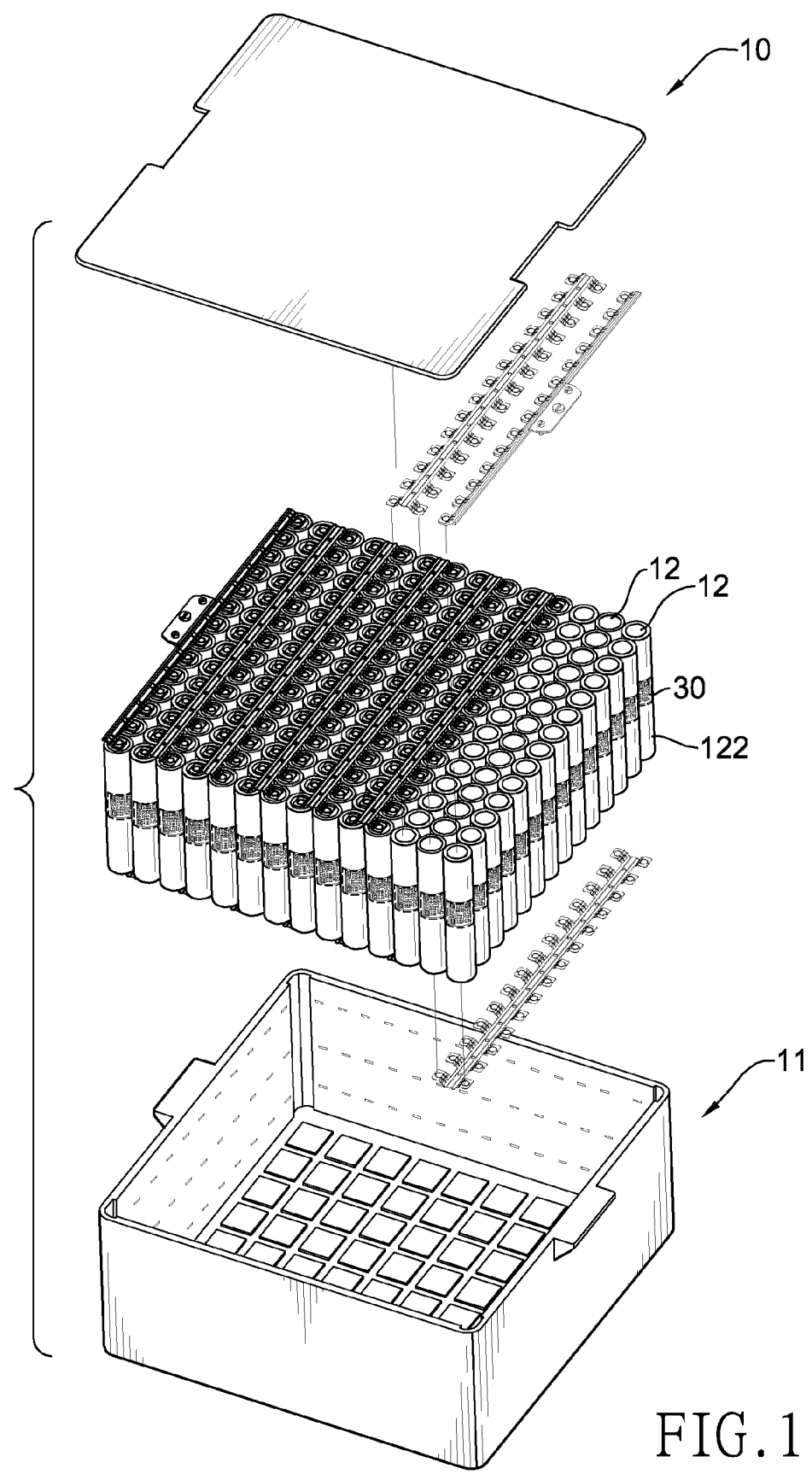
FIG. 1 is an exploded perspective view of a first embodiment of a battery pack in accordance with the present invention.
Figure 2:
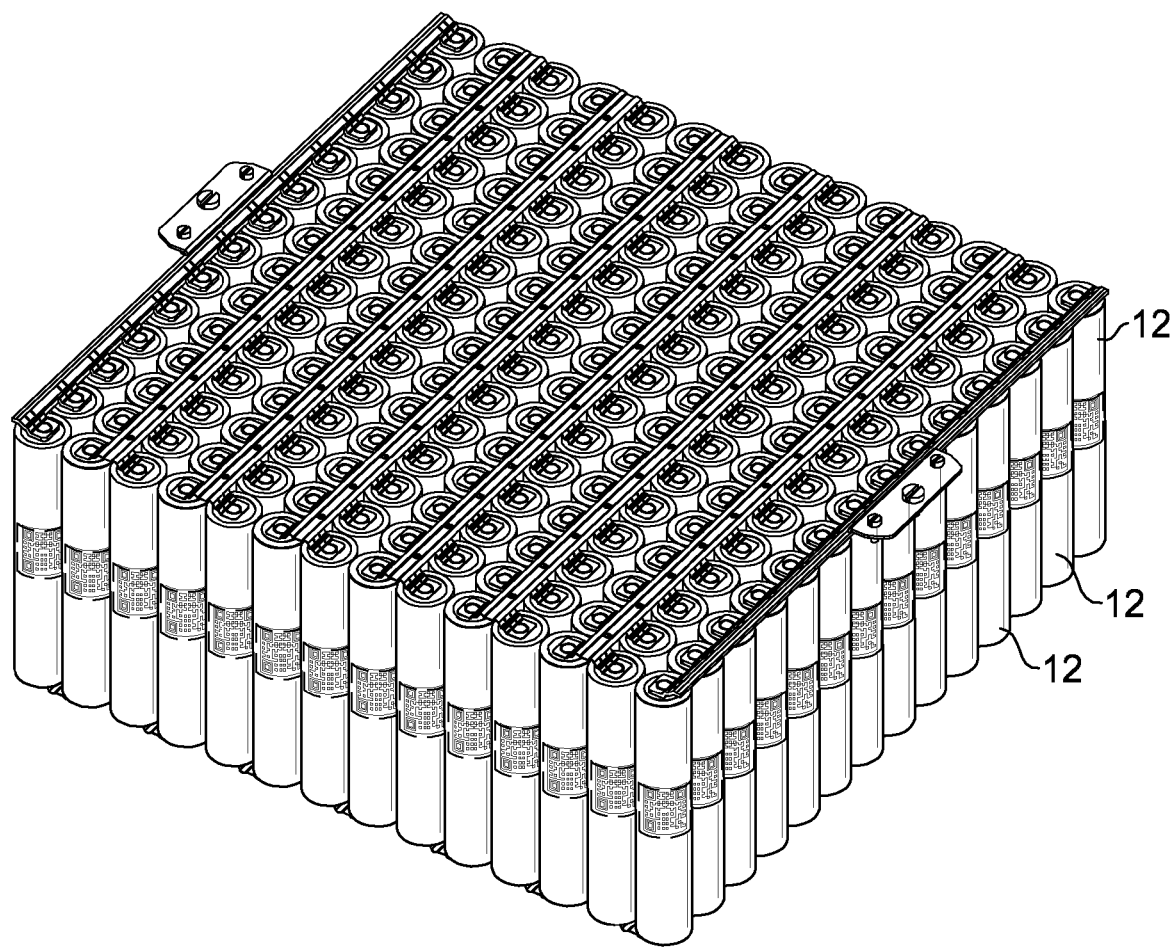
FIG. 2 is a perspective view of FIG. 1.

With reference to FIGS. 1, 2, 3A and 3B, a first embodiment of a battery pack 10 in accordance with the present invention has a casing 11 and multiple battery cells 12.

The battery cells 12 are securely mounted in the casing 11 and electronically connected to each other. Each of the battery cells 12 has a battery body 121, a protection layer 122, an inner identifier 20 storing a first identification code and an outer identifier 30 storing a second identification code. The first and second identification codes satisfy a specific matching criterion, such as a mathematical relationship described by an algorithm.

The inner identifier 20 is securely mounted on an outside of the battery body 121. The protection layer 122 is securely mounted around the outside of the battery body 121. The outer identifier 30 is further securely mounted on the protection layer 122.

In the first embodiment, the inner identifier 20 is a wireless identifier, such as RFID and has a chip 21 and an antenna 22. The chip 21 is electronically connected to the antenna 22 and stores the first identification code, which may be a serial number or a batch number. To further increase the identification security of the wireless identifier, the chip 21 further builds in a communication procedure supported by a cryptographic communication protocol for smart card. Therefore, data from the chip is transmitted in the wireless channel for RFID according to the cryptographic communication protocol for smart card. In addition, the first identification code may be further mingled or encrypted by Secure Hash Standard (SHA1) of FIPS 108-1, DES, or AES to increase the difficulty of eavesdropping. The first identification code is encrypted and then stored in the chip.

The outer identifier 30 may be an encoded serial number pattern or batch number pattern printed or carved by laser on the outside of the protection layer 122. The outer identifier 30 may be an optical pattern, such as one-dimensional bar code or a two-dimensional bar code. In the first embodiment, a unique encoding is adopted in the two-dimensional optical pattern to prevent a general bar code reader from recognizing the correct second identification code. Furthermore, the optical pattern may be printed by phosphor ink, ink sensitive to IR, photo ink, thermal ink, magnetic ink, or invisible ink.

To prevent the inner identifier 20 from being stolen, the protection layer 122 may use the thermoplastic film. When the thermoplastic film is securely mounted around the outside of the battery body 121, the inner identifier 20 is securely covered by the thermoplastic film and the outer identifier 30 overlaps the inner identifier 20. Therefore, when one breaks the protection layer 122 to steal the inner identifier 20, the outer identifier 30 on the protection layer 122 will be broken, too. In brief, there is no easy way to steal the complete inner and outer identifiers 20, 30 at the same time from the battery cell 12.

Figure 4:
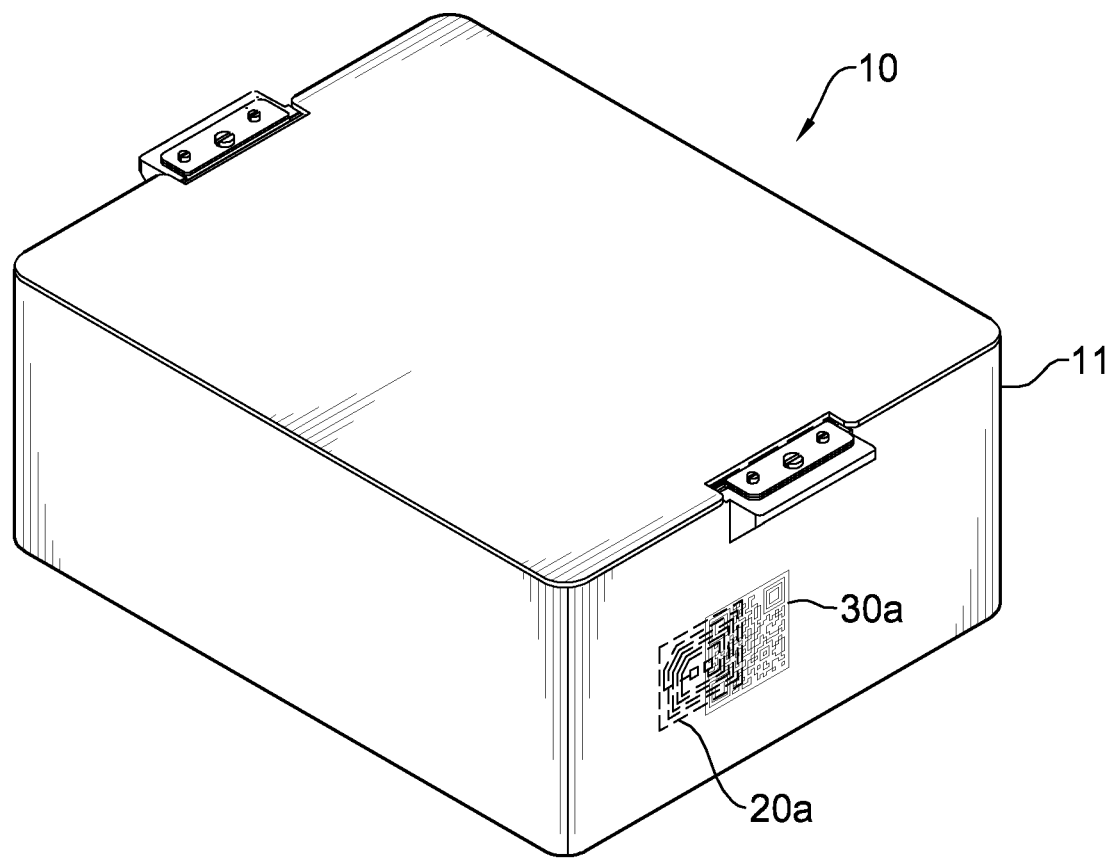
FIG. 4 is a perspective view of a second embodiment of a battery pack in accordance with the present invention.
Figure 5:
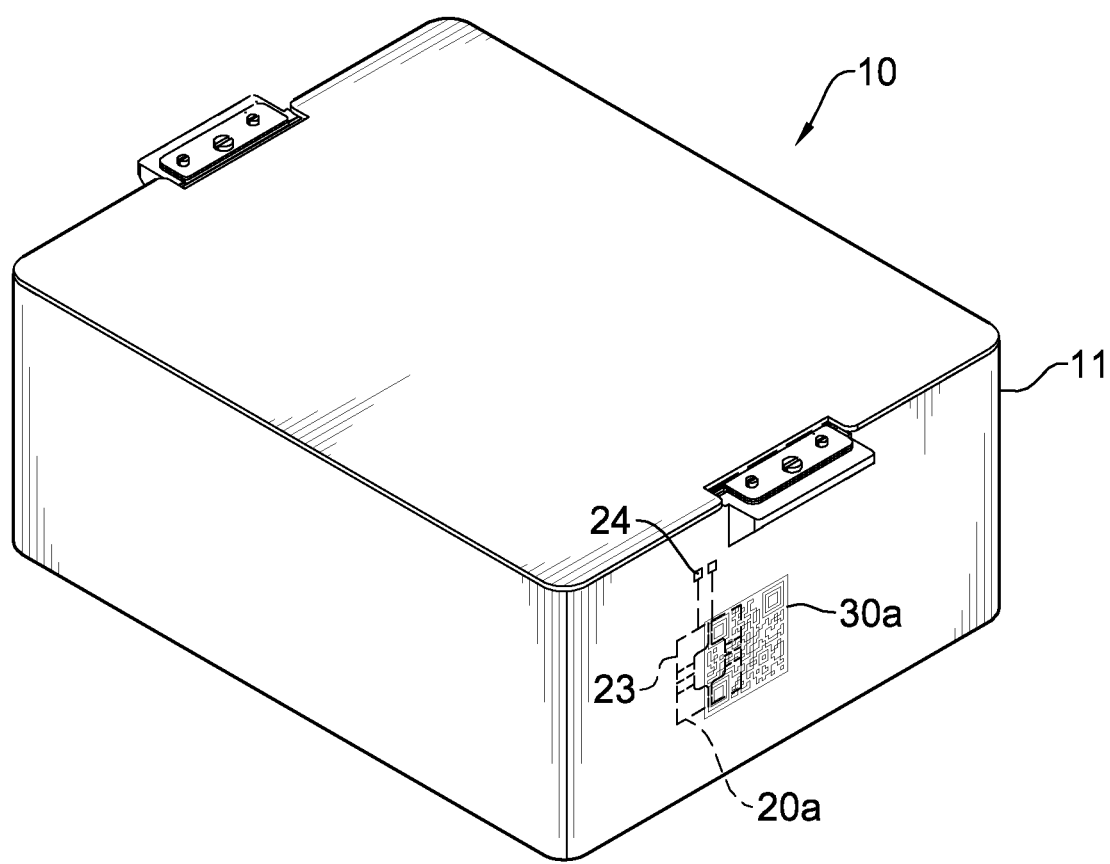
FIG. 5 is a perspective view of a third embodiment of a battery pack in accordance with the present invention.

With further reference to FIG. 4, a second embodiment of an anti-fake battery pack in accordance with the present invention is same as the first embodiment thereof and further has an inside identifier 20a and an outside identifier 30a respectively storing the first and second identification codes. The inside identifier 20a is mounted inside of the casing 11 and the outside identifier 30a is mounted on outside of the casing 11. Therefore, the battery pack 10 has two identification procedures to check whether the casing or any of the battery cells 12 has been substituted. With further reference to FIG. 5, the inside and outside identifiers 20a, 30a may be a wireless identifier or photo-identifier mentioned above. In addition, the inside identifier 20a may be a wired identifier having a smart card chip 23 and multiple signal terminals 24. The signal terminals 24 are mounted outside of the casing 11 and electronically connected to smart card chip 23, so an external smart card reader can read an identification code of the smart card chip 23 of the inside identifier 20a through the signal terminals 24 without opening the casing 11.

Figure 6:
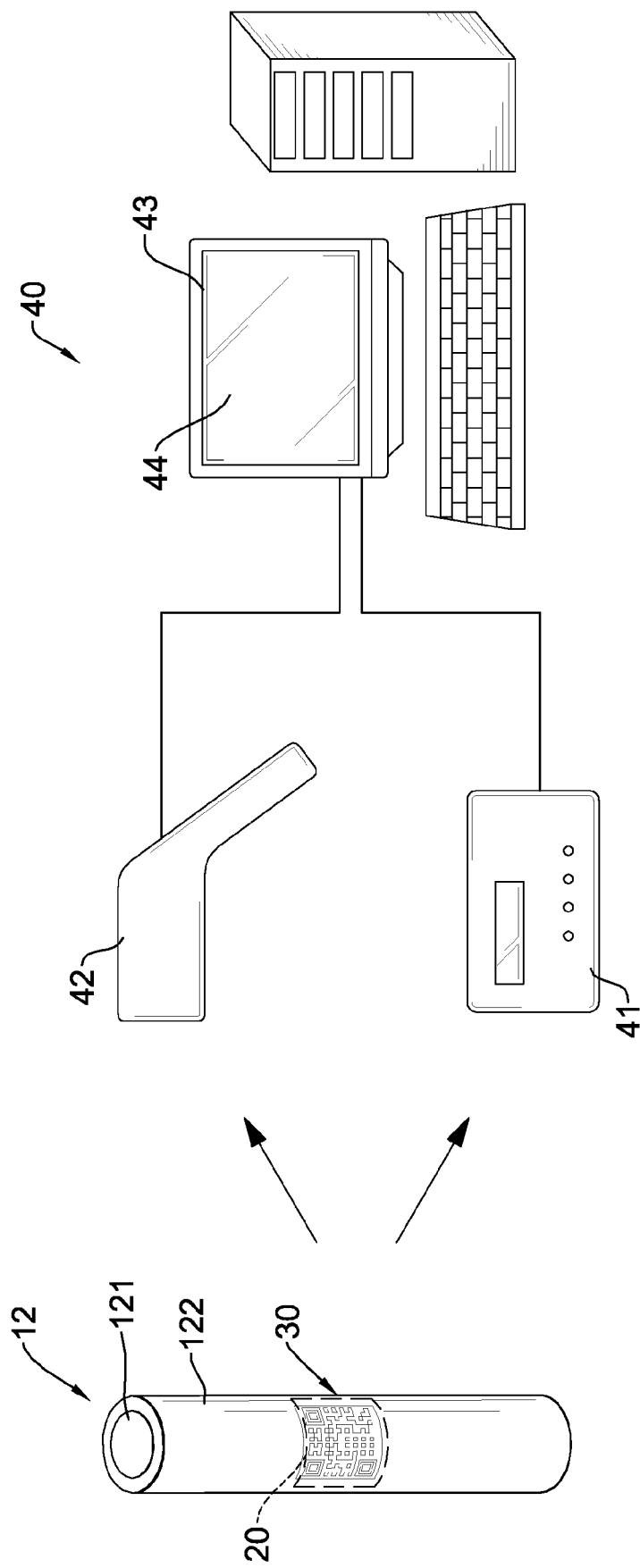
FIG. 6 is a schematic view of an identification system of the battery pack in accordance with the present invention.

With reference to FIGS. 1, 4 and 6, an identification system has the anti-fake battery pack 10 and an identifying device 40. The identifying device 40 has a first reader 41, a second reader 42, a main controller 43, and an alarm device 44.

The first reader 41 links to the inner identifier 20 and the inside identifier 20a to retrieves the first identification codes. For the RFID identifier, the first reader 41 is a RFID reader. If the inner identifier 20 or the inside identifier 20a has smart card chip, the first reader 41 will be a smart card reader.

The second reader 42 may be an optical reader to read the second identification codes of the outer identifier 30 and the outside identifier 30a. The second reader 42 may further have an input device (not shown), such as a keyboard or touch panel etc., to allow the user to input the second identification code directly. For optical patterns, the second reader 42 is an optical reader. If the outer identifier 30 or the outside identifier 30a is a two-dimensional bar code, the second reader 42 is an IR reader or an OID (Object Identification) photo-detector.

The main controller 43 is electronically connected to the first and second readers 41, 42 to obtain the first and second identification codes and further contains an identification procedure therein and may store the specific matching criterion, such as a mathematical relationship described by an algorithm.

The alarm device 44 is electronically connected to the main controller 43 and may be a display or a light indicator or a speaker. The alarm device 44 is driven by the main controller 43.

The first and second readers 41, 42, the main controller 43, and alarm device 44 may further constitute an identification system according to different applications.

Figure 7:
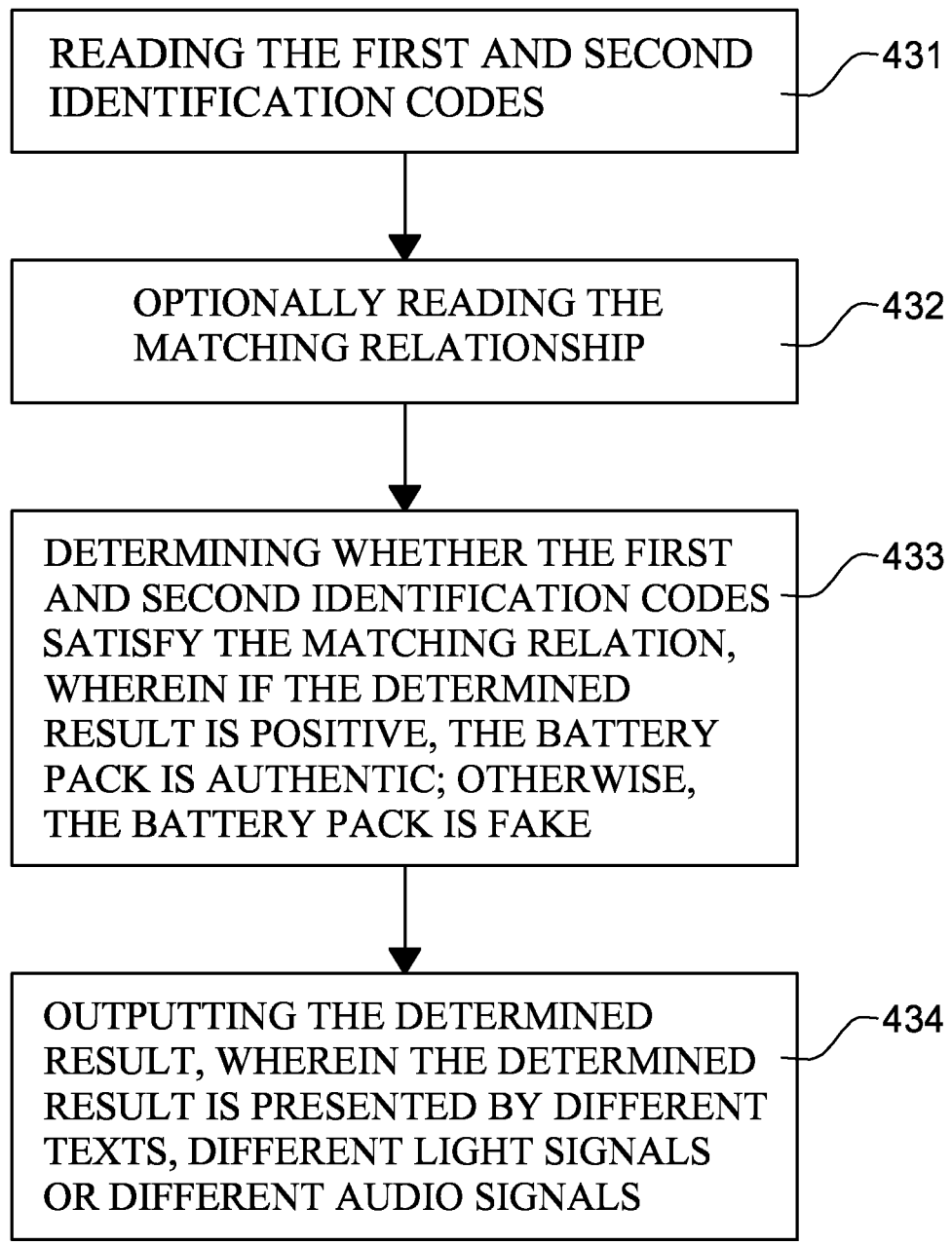
FIG. 7 is a flow chart of an identifying procedure of the identification system in accordance with the present invention.
Figure 8:
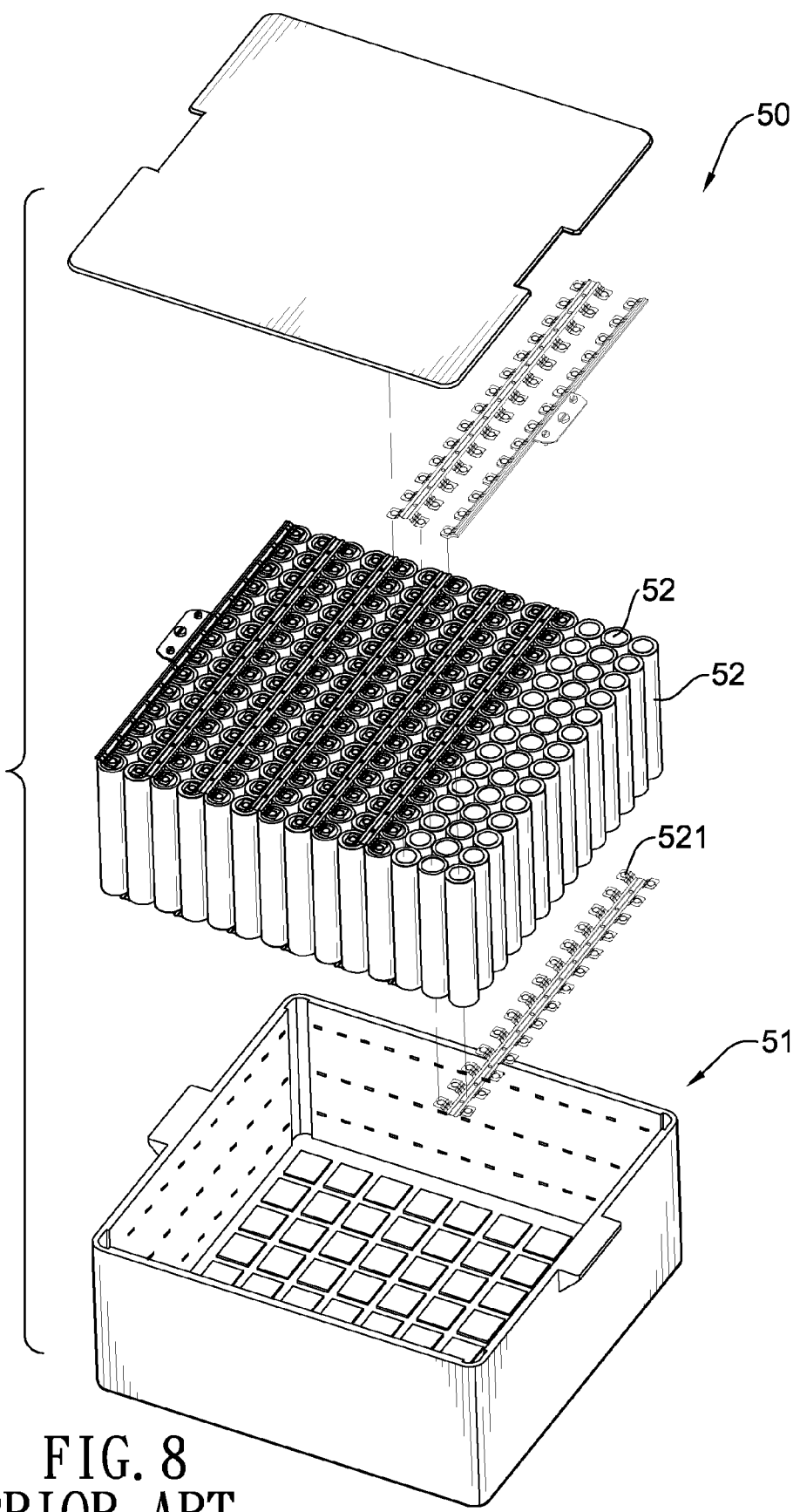
FIG. 8 is an exploded perspective view of a conventional battery pack in accordance with the prior art.

With further reference to FIG. 7, which is a flow chart of the identification procedure of the main controller 43, the identification procedure has following steps:
(a) reading the first and second identification codes (431);
(b) reading information about the matching criterion, such as the parameters for a math algorithm (432);
(c) determining whether the first and second identification codes satisfy the matching criterion (433), wherein the first and second identification codes are put in the math algorithm to determine if the first identification code and the second identification code satisfy the matching mathematical relationship; if the comparing result is positive, the battery cell or pack is authentic; on the contrary, the battery cell or pack is fake; and
(d) outputting a determining result, wherein the determined result is presented by different texts, different light signals or different audio signals (434).

Based on the foregoing description, each battery cell has the inner identifier and the outer identifier so the external identifying device has to read the first and second identification codes and to determine whether the battery cell is authentic or not. In addition, the inner and outer identifiers prevent the battery cell from being stolen. That is, if the protection layer is broken, the outer identifier is broken. The inner identifier is covered by the protection layer, so the inner identifier can not be stolen without breaking the protection layer. Therefore, the present invention provides double identifying procedures to increase security of identification and decrease the possibility of copying the first and second identification codes.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An identification system, comprising:
an anti-fake battery having a casing and multiple battery cells securely mounted inside the casing, wherein each of the battery cells comprises:
a battery body;
an inner identifier securely mounted outside the battery body and storing a first identification code;
a protection layer securely mounted outside the battery body and covering the inner identifier; and
an outer identifier securely formed outside the protection layer and storing a second identification code, wherein the first and second identification codes satisfy a matching relationship; and
an identifying device comprising:
a first reader linking to the inner identifier of each of the battery cell to read the first identification code;
a second reader linking to the outer identifier of each of the battery cell to read the second identification code;
a main controller electronically connected to the first and second readers to obtains the first and second identification codes, and building in an identification procedure and the matching relationship; and
an alarm device electronically connected to the main controller and driven by the main controller to indicate whether the matching relationship is satisfied.

2. The identification system as claimed in claim 1, wherein the casing further comprises:
an inside identifier securely mounted inside the casing and storing the first identifier code; and
an outside identifier securely mounted outside the casing and storing the second identifier code.

3. The identification system as claimed in claim 1, wherein the outer identifier on the protection layer overlaps the inner identifier.

4. The identification system as claimed in claim 2, wherein the outer identifier on the protection layer overlaps the inner identifier.

5. The identification system as claimed in claim 3, wherein the inner identifier is a wireless identifier.

6. The identification system as claimed in claim 4, wherein the inner identifier is a wireless identifier.

7. The identification system as claimed in claim 5, wherein the inner identifier is a RFID and comprises:
   a chip storing the first identification code; and
   an antenna electronically connected to the chip.

8. The identification system as claimed in claim 6, wherein the inner identifier is a RFID and comprises:
   a chip storing the first identification code; and
   an antenna electronically connected to the chip.

9. The identification system as claimed in claim 5, wherein the wireless identifier builds in a communication procedure supported by a cryptographic communication protocol.

10. The identification system as claimed in claim 6, wherein the wireless identifier builds in a communication procedure supported by a cryptographic communication protocol.

11. The identification system as claimed in claim 9, wherein the cryptographic communication protocol is a cryptographic communication protocol for smart card.

12. The identification system as claimed in claim 10, wherein the cryptographic communication protocol is a cryptographic communication protocol for smart card.

13. The identification system as claimed in claim 7, wherein the first identification code is an encrypted code.

14. The identification system as claimed in claim 8, wherein the first identification code is an encrypted code.

15. The identification system as claimed in claim 13, wherein the first identification code is encrypted by Secure Hash Standard (SHA1) of FIPS 108-1, DES, or AES.

16. The identification system as claimed in claim 14, wherein the first identification code is encrypted by Secure Hash Standard (SHA1) of FIPS 108-1, DES, or AES.

17. The identification system as claimed in claim 2, wherein the inside identifier of the casing comprises:
   a smart card chip storing the first identification code; and
   multiple signal terminals mounted outside the casing and electronically connected to the smart card chip.

18. The identification system as claimed in claim 1, wherein the outer identifier is a serial number pattern or a batch number pattern directly formed on the protection layer.

19. The identification system as claimed in claim 2, wherein the outer identifier is a serial number pattern or a batch number pattern directly formed on the protection layer.

20. The identification system as claimed in claim 1, wherein the outer identifier is an optical pattern directly formed on the protection layer.

21. The identification system as claimed in claim 2, wherein the outer identifier is an optical pattern directly formed on the protection layer.

22. The identification system as claimed in claim 20, wherein the optical pattern is a one-dimensional bar code or a two-dimensional bar code.

23. The identification system as claimed in claim 21, wherein the optical pattern is a one-dimensional bar code or a two-dimensional bar code.

24. The identification system as claimed in claim 20, wherein the optical pattern is printed on the protection layer by phosphor ink, ink sensitive to IR, photo ink, thermal ink, magnetic ink, or invisible ink.

25. The identification system as claimed in claim 21, wherein the optical pattern is printed on the protection layer by phosphor ink, ink sensitive to IR, photo ink, thermal ink, magnetic ink, or invisible ink.

26. The identification system as claimed in claim 7, wherein the first reader is an RFID reader.

27. The identification system as claimed in claim 8, wherein the first reader is an RFID reader.

28. The identification system as claimed in claim 17, wherein the first reader is a smart card reader.

29. The identification system as claimed in claim 18, wherein the second reader is an input device.

30. The identification system as claimed in claim 19, wherein the second reader is an input device.

31. The identification system as claimed in claim 22, wherein the second reader is an IR reader.

32. The identification system as claimed in claim 23, wherein the second reader is an IR reader.

33. The identification system as claimed in claim 22, wherein the second reader is an OID photo-detector.

34. The identification system as claimed in claim 23, wherein the second reader is an OID photo-detector.

35. The identification system as claimed in claim 1, wherein the alarm device is a display or a light indicator or speaker.

36. The identification system as claimed in claim 2, wherein the alarm device is a display or a light indicator or speaker.

37. The identification system as claimed in claim 35, wherein the identification procedure comprises steps of:
   (a) reading the first and second identification codes;
   (b) reading the matching relationship;
   (c) determining whether the first and second identification codes satisfy the match relation, wherein if a determining result is positive, the battery cell is authentic; on the contrary, the battery cell is fake; and
   (d) outputting a determining result, wherein the determining result is presented by different texts, different light signals or different audio signals.

38. The identification system as claimed in claim 36, wherein the identification procedure comprises steps of:
   (a) reading the first and second identification codes;
   (b) optionally reading the matching relationship;
   (c) determining whether the first and second identification codes satisfy the match relation, wherein if the determining result is positive, the battery cell is authentic; otherwise, the battery cell is fake; and
   (d) outputting a determining result, wherein the determining result is presented by different texts, different light signals or different audio signals.

39. The identification system as claimed in claim 37, wherein the main controller further stores a math algorithm and puts the first and second identification codes in the math algorithm to determine if the first identification code and the second identification code satisfy a matching mathematical relationship.

40. The identification system as claimed in claim 38, wherein the main controller further stores a math algorithm and puts the first and second identification codes in the math algorithm to determine if the first identification code and the second identification code satisfy a matching mathematical relationship.

41. An identification system, comprising:
   a battery cell having:
   a battery body;
   an inner identifier securely mounted outside the battery body and storing a first identification code;
   a protection layer securely mounted outside the battery body and covering the inner identifier; and
   an outer identifier securely formed outside the protection layer and storing a second identification code, wherein the first and second identification codes satisfy a matching relationship; and an identifying device comprising:
- a first reader linking to the inner identifier of each of the battery cell to read the first identification code;
- a second reader linking to the outer identifier of each of the battery cell to read the second identification code;
- a main controller electronically connected to the first and second readers to obtains the first and second identification codes, and building in an identification procedure and the matching relationship; and
- an alarm device electronically connected to the main controller and driven by the main controller to indicate whether the matching relationship is satisfied.

42. The identification system as claimed in claim 41, wherein the outer identifier on the protection layer overlaps the inner identifier.

43. The identification system as claimed in claim 42, wherein the inner identifier is a wireless identifier.

44. The identification system as claimed in claim 43, wherein the inner identifier is a RFID and comprises:
- a chip storing the first identification code; and
- an antenna electronically connected to the chip.

45. The identification system as claimed in claim 43, wherein the wireless identifier builds in a communication procedure supported by a cryptographic communication protocol.

46. The identification system as claimed in claim 45, wherein the cryptographic communication protocol is a cryptographic communication protocol for smart card.

47. The identification system as claimed in claim 44, wherein the first identification code is an encrypted code.

48. The identification system as claimed in claim 47, wherein the first identification code is encrypted by Secure Hash Standard (SHA1) of FIPS 108-1, DES, or AES.

49. The identification system as claimed in claim 48, wherein the inside identifier of a casing comprises:
- a smart card chip storing the first identification code; and
- multiple signal terminals mounted outside the casing and electronically connected to the smart card chip.

50. The identification system as claimed in claim 41, wherein the outer identifier is an optical pattern directly formed on the protection layer.

51. The identification system as claimed in claim 50, wherein the optical pattern is a one-dimensional bar code or a two-dimensional bar code.

52. The identification system as claimed in claim 50, wherein the optical pattern is printed on the protection layer by phosphor ink, ink sensitive to IR, photo ink, thermal ink, magnetic ink, or invisible ink.

53. The identification system as claimed in claim 44, wherein the first reader is an RFID reader.

54. The identification system as claimed in claim 49, wherein the second reader is an input device.

55. The identification system as claimed in claim 51, wherein the second reader is an IR reader.

56. The identification system as claimed in claim 51, wherein the second reader is an OID photo-detector.

57. The identification system as claimed in claim 41, wherein the alarm device is a display or a light indicator or speaker.

58. The identification system as claimed in claim 57, wherein the identification procedure comprises steps of:
- (a) reading the first and second identification codes;
- (b) optionally reading the matching relationship;
- (c) determining whether the first and second identification codes satisfy the match relation, wherein if a determining result is positive, the battery cell is authentic; on the contrary, the battery cell is fake; and
- (d) outputting a determining result, wherein the determining result is presented by different texts, different light signals or different audio signals.

59. The identification system as claimed in claim 58, wherein the main controller further stores a math algorithm and puts the first and second identification codes in the math algorithm to determine if the first identification code and the second identification code satisfy a matching mathematical relationship.

* * * * *